(12) United States Patent
Restuccia et al.

(10) Patent No.: US 9,908,298 B2
(45) Date of Patent: Mar. 6, 2018

(54) COMPOSITE MATERIALS WITH ELECTRICALLY CONDUCTIVE AND DELAMINATION RESISTANT PROPERTIES

(71) Applicant: Cytec Industries Inc., Woodland Park, NJ (US)

(72) Inventors: Carmelo Luca Restuccia, Chester (GB); Fiorenzo Lenzi, Vitulazio (IT); Emiliano Frulloni, Rossett (GB)

(73) Assignee: CYTEC INDUSTRIES INC., Woodland Park, NJ (US)

( * ) Notice: Subject to any disclaimer, the term of this patent is extended or adjusted under 35 U.S.C. 154(b) by 195 days.

(21) Appl. No.: 14/560,340

(22) Filed: Dec. 4, 2014

(65) Prior Publication Data
US 2015/0166743 A1    Jun. 18, 2015

(30) Foreign Application Priority Data
Dec. 13, 2013 (GB) .................................. 1322093.4

(51) Int. Cl.
*C08J 5/04* (2006.01)
*B29C 70/02* (2006.01)
(Continued)

(52) U.S. Cl.
CPC ............ *B29C 70/02* (2013.01); *B29C 70/025* (2013.01); *B29C 70/88* (2013.01); *B29C 70/882* (2013.01);
(Continued)

(58) Field of Classification Search
CPC ........ B32B 2262/106; B32B 2264/108; B32B 2307/202; B32B 37/14; B29C 70/88
See application file for complete search history.

(56) References Cited

U.S. PATENT DOCUMENTS

| | | | |
|---|---|---|---|
| 6,117,518 A * | 9/2000 | Cawse ................. | B29C 70/088 428/116 |
| 2008/0295955 A1* | 12/2008 | Cawse ..................... | B32B 5/22 156/276 |

(Continued)

FOREIGN PATENT DOCUMENTS

| EP | 2053078 A1 | 4/2009 |
|---|---|---|
| WO | 2008/115640 A2 | 9/2008 |

(Continued)

OTHER PUBLICATIONS

International Search Report. PCT/US2014/068693. dated Sep. 25, 2015.

*Primary Examiner* — Alexandre Ferre
(74) *Attorney, Agent, or Firm* — Thi Dang

(57) ABSTRACT

A curable composite material that may be used in applications where both high mechanical performance and high electrical conductivity are required. The curable composite material includes two or more layers of reinforcement fibers that have been infused or impregnated with a curable matrix resin and an interlaminar region containing carbon nanomaterials, e.g. carbon nanotubes, and insoluble polymeric toughening particles. The carbon nanomaterials are significantly smaller in size as compared to the polymeric toughening particles. The polymeric toughening particles are substantially insoluble in the matrix resin upon curing of the composite material, and remain as discreet particles at the interlaminar region after curing. Methods for fabricating curable composite materials and cured composite structures are also disclosed.

20 Claims, 9 Drawing Sheets

(51) Int. Cl.
  *C08J 5/00*   (2006.01)
  *C08J 5/24*   (2006.01)
  *C08J 5/10*   (2006.01)
  *B29C 70/88*  (2006.01)
  *B64D 45/02*  (2006.01)

(52) U.S. Cl.
  CPC .............. *B64D 45/02* (2013.01); *C08J 5/005* (2013.01); *C08J 5/10* (2013.01); *C08J 5/24* (2013.01); *C08J 2363/00* (2013.01); *C08J 2379/08* (2013.01); *C08J 2477/00* (2013.01); *C08J 2479/08* (2013.01); *C08J 2481/06* (2013.01); *Y10T 156/10* (2015.01); *Y10T 428/254* (2015.01)

(56) References Cited

U.S. PATENT DOCUMENTS

| | | |
|---|---|---|
| 2009/0140098 A1 | 6/2009 | Lengsfeld et al. |
| 2010/0189946 A1 | 7/2010 | Hochstetter et al. |
| 2011/0163275 A1* | 7/2011 | Simmons ............ C08G 59/5033 252/511 |
| 2011/0294387 A1* | 12/2011 | Simmons ................ B32B 5/022 442/376 |
| 2012/0115388 A1* | 5/2012 | Baidak .............. B29C 45/14508 442/393 |
| 2012/0141763 A1* | 6/2012 | Cawse ...................... B32B 5/26 428/292.1 |
| 2012/0164907 A1* | 6/2012 | Restuccia ................ B32B 5/022 442/381 |
| 2016/0107739 A1* | 4/2016 | Restuccia ................ C08K 3/08 428/114 |

FOREIGN PATENT DOCUMENTS

| | | |
|---|---|---|
| WO | 2009147415 A1 | 12/2009 |
| WO | 2010/144009 A1 | 12/2010 |
| WO | 2010/144010 A1 | 12/2010 |
| WO | 2015/130368 A2 | 9/2015 |

* cited by examiner

COMPOSITE MATERIALS WITH ELECTRICALLY CONDUCTIVE AND DELAMINATION RESISTANT PROPERTIES

This application claims the benefit of prior United Kingdom Application No. 1322093.4 filed on Dec. 13, 2013, which is incorporated herein in its entirety.

BACKGROUND

In the aerospace industry, the use of fiber-reinforced polymer composites in primary and secondary structures of aircraft is becoming more prevalent. Composite structures are traditionally made by laying up plural layers (or plies) of resin-impregnated fibrous reinforcement (known as prepregs) on a mold surface, followed by consolidating and/or curing. The advantages of fiber-reinforced polymer composites include high strength-to-weight ratio, excellent fatigue endurance, corrosion resistance and flexibility, allowing for a significant reduction in component parts, and reducing the need for fasteners and joints. However, the application of these materials for modern aircraft's primary and secondary structures presents special challenges due to the dielectric nature of the matrix resin. Although the use of carbon fibers as reinforcing fibers in composite materials can deliver some degree of electrical conductivity along their longitudinal direction due to their graphitic nature, the dielectric properties of the matrix resins in the composite materials reduce the overall electrical conductivity of the composite materials.

Increasing the electrical conductivity of fiber-reinforced polymer composites is desirable in order to meet the requirements for lightning strike protection of an aircraft and to avoid a phenomenon called "edge glow" which is particularly critical for the composite wing assembly. The edge glow phenomenon manifests itself as a bright glow or spark in composite skin/spar assembly with energy sufficient to be a potential ignition source of fuel vapors.

This edge glow phenomenon may appear during a lighting strike event, especially on composite laminates having low z-direction electrical conductivity. During a lightning strike event, a transient charge with high intensity current travels through the skin and then enters the wing substructure (e.g. structural spar or ribs) because of the fasteners connecting the two composite parts. So typically, in a composite skin/spar assembly, current travels partially on the skin and partially through the spar which represents one of the walls of the fuel tank.

The current passes laterally from the fasteners through adjacent composite plies of the spar and tends to travel along the fibers because of the higher electrical conductivity as compared to the resin matrix. This path may generate the typical bright glow or sparks at the spar/rib cap edge, which is called "edge glow" phenomenon by those skilled in the art.

FIG. 1 shows a potential critical current path during a lightning strike event on a composite wing box. The edge glow phenomenon appears more critical when the resin between plies of fiber reinforcement is highly resistive, and consequently, the current tends not to flow between adjacent plies. If the z-direction conductivity is too low, significant voltage drops can be produced between plies during the strike, thus increasing the risk of edge glow.

As known by those skilled in the art, edge glow phenomenon is associated with electron surface ejections or plasma generation at the composite edges and often appears as a kind of resin explosion. Uncertainty regarding the nature of this phenomenon has posed several attentions in relation to the ignition capabilities of fuel vapors during a lightning strike event.

A conventional solution is to apply a sealant at the fuel tank (see FIG. 2). An example of such fuel tank sealant is the PR 1776 Class B sealant from LE JOINT FRANCAIS. However, such method leads to additional weight and is not always effective due to the lack of standardization and difficulties in the sealant application. Over time, the sealant becomes ineffective due to aging, or can be totally washed off by the fuel in the tank. Moreover, a lightning strike can result in the generation of high pressure gasses at the cut edge which may shatter the edge seal. There remains a need for a multifunctional composite material that can address the edge glow issue discussed above while providing good mechanical properties such as resistance to impact and delamination.

SUMMARY

Composite materials with electrical conductivity and impact-resistance properties are disclosed herein. These composite materials contain polymeric toughening particles and carbon-based, nano-sized structures at the interlaminar region between adjacent layers of reinforcement fibers. The polymeric toughening particles are substantially insoluble in the thermoset matrix resin at the interlaminar region during the cure of the composite materials, and remain as discreet particles at the interlaminar region of the cured composite materials.

DETAILED DESCRIPTION

Figure 1:
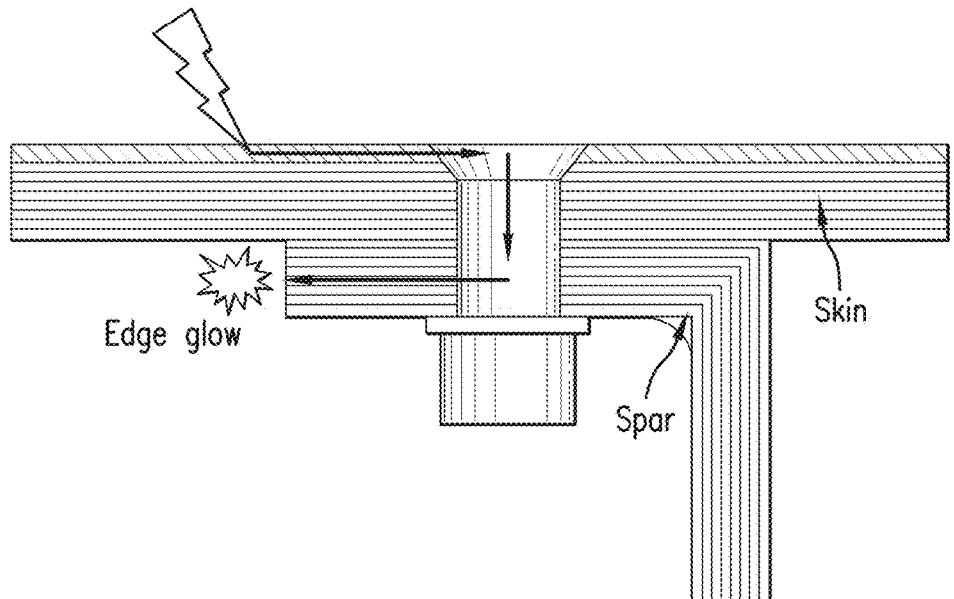
FIG. 1 shows the typical current path during a lightning strike event on a composite wing box generating the "edge glow" phenomenon.
Figure 2:
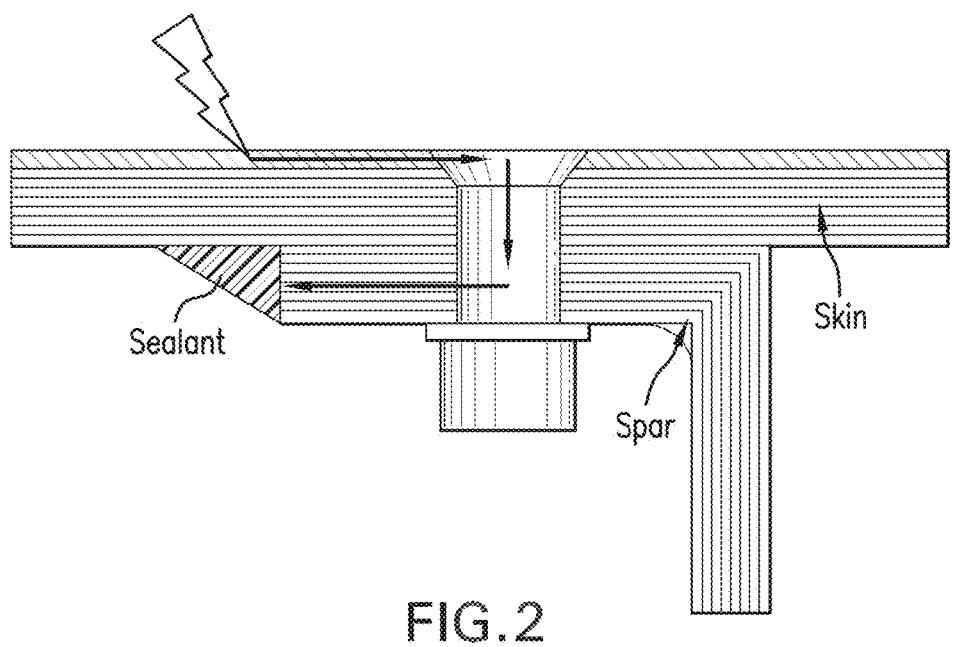
FIG. 2 shows a sealant applied at spar cap edge of the typical construction of a composite wing.

It is widely accepted in the aerospace industry that two of the main design drivers for aircrafts composite structures are their resistance to specific impact events and their tolerance to catastrophic failures caused by the damage propagation after impact.

The interlaminar region of a composite laminate presents one of the most challenging failure mechanisms to address. Delamination of such composite laminate is an important failure mode for composite materials. Delamination occurs when two laminated layers de-bond from each other. Important design limiting factors include the energy needed to initiate the delamination and the energy needed to propagate it.

The need to improve the impact resistance performance of composite structures, especially for aircrafts primary structures, has triggered the development of a new generation of composite materials toughened with interlaminar particles. Such technological solution provides high impact resistance to carbon fiber-reinforced composites but also creates an electrically insulating inter-laminar region between adjacent plies, resulting in a significant reduction in the overall composite structure's electrical conductivity especially in the z-direction. The "z-direction" refers to the direction orthogonal to the plane on which the reinforcing fibers are arranged in a composite structure or the axis through the thickness of the composite structure.

The electrical conductivity of composite materials can be improved by incorporating different conductive materials, such as conductive particles, in the matrix resin of the fiber-reinforced polymer composite, or in the interlaminar regions of a multilayered composite structure, e.g. prepreg layup. For example, metallic fillers may be added at high loadings to increase the resin electrical conductivity, but this leads to significant weight gain and reduction in impact resistance-related properties such as Compression Strength After Impact (CAI) and fracture toughness in mode I and II ($G_{Ic}$ and $G_{IIc}$). As such, the state-of-the art solutions are such that the z-direction conductivity of a composite can be improved but not, simultaneously, its mechanical performance. A cured composite (e.g. prepreg layup) with improved impact performance is one with improved CAI and fracture toughness ($G_{Ic}$ and $G_{IIc}$). CAI measures the ability of a composite material to tolerate damage. In the test for measuring CAI, the cured composite is subjected to an impact of a given energy and then loaded in compression. The damage area and the dent depth are measured following the impact and prior to the compression test. During this test, the composite material is constrained to ensure that no elastic instability is taking place and the strength of the composite material is recorded.

Fracture toughness is a property which describes the ability of a material containing a crack to resist fracture, and is one of the most important properties of a material for aerospace applications. Fracture toughness is a quantitative way of expressing a material's resistance to brittle fracture when a crack is present.

Fracture toughness may be quantified as strain energy release rate ($G_c$), which is the energy dissipated during fracture per unit of newly created fracture surface area. $G_c$ includes $G_{IC}$ (Mode I—opening mode) or $G_{IIc}$ (Mode II—in plane shear). The subscript "Ic" denotes Mode I crack opening, which is formed under a normal tensile stress perpendicular to the crack, and the subscript "IIc" denotes Mode II crack produced by a shear stress acting parallel to the plane of the crack and perpendicular to the crack front. The initiation and growth of a delamination is often determined by examining Mode I and Mode II fracture toughness.

It has been discovered that the combination of carbon nanomaterials and certain polymeric particles at the interlaminar region of a multilayered composite material produce a synergistic effect that include an improvement in the z-direction conductivity, and simultaneously, an improvement in CAI and $G_{Ic}$. The synergistic effect was found by combining the positive effects of the carbon nanomaterials with the positive effects of the toughening particles, whereby the interaction of these components in the composite material produce an effect greater than the sum of their individual effects.

Disclosed herein is a curable, multifunctional composite material, which may be successfully used in those aircrafts applications where high mechanical performance and high electrical conductivity are required. In cured state, the composite material's improved electrical conductivity can function to spread out or dissipate electric currents, such as those generated by a lightning strike, over a greater area of a composite structure produced from the composite material, thereby reducing the likelihood of a catastrophic damage to localized portions of the composite structure. As such, using this multifunctional composite material can be an efficient solution for mitigating lightning strike's direct effect and for preventing the edge glow phenomenon in composites discussed above. Furthermore, the cured composite material provides the additional benefit of electromagnetic shielding.

One aspect of the present disclosure is directed to a curable composite material composed of two or more layers of reinforcement fibers that have been infused or impregnated with a curable matrix resin, preferably, a thermoset resin. The interlaminar region between adjacent layers of reinforcement fibers contains a curable matrix resin with carbon nanomaterials dispersed throughout and polymeric toughening particles embedded in the same matrix resin. The carbon nanomaterials are significantly smaller in size as compared to the polymeric toughening particles. The polymeric toughening particles are substantially insoluble in the matrix resin upon curing of the composite material, and remain as discreet particles at the interlaminar region after curing. In certain embodiments, the polymeric toughening particles are swellable particles. It is preferred that the interlaminar region is free of any soluble thermoplastic particles that dissolve in the matrix resin upon curing.

The resin at the interlaminar region (without nanomaterials and toughening particles) may be the same or different from the matrix resin impregnating the reinforcement fibers. In some embodiments, the matrix resin impregnating the reinforcement fibers also contains carbon nanomaterials dispersed therein.

Figure 3:
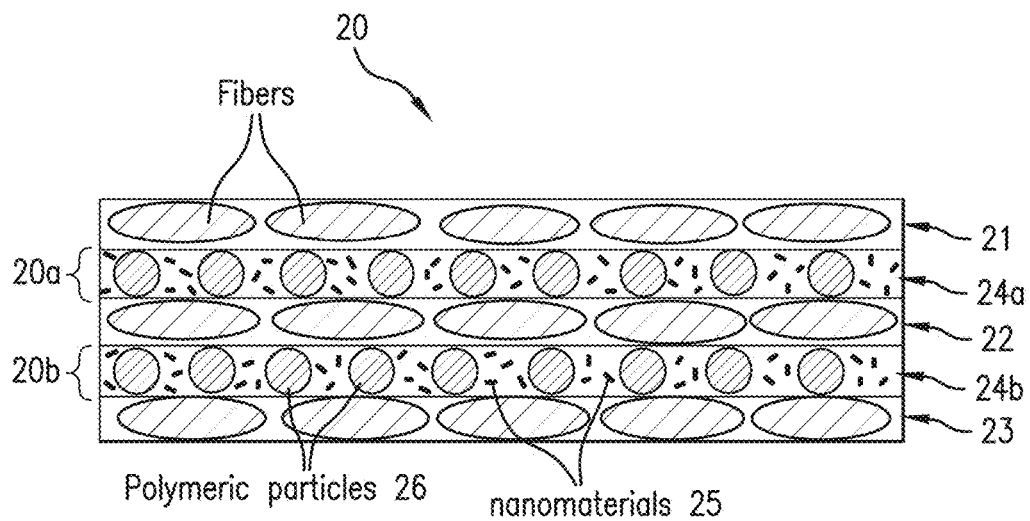
FIG. 3 schematically illustrates a curable composite material with interlaminar regions containing toughening particles and carbon nanomaterials, according to an embodiment of the present disclosure.

FIG. 3 schematically illustrates a curable composite material 20 according to an embodiment of the present disclosure. The composite material 20 contains interlaminar regions 20a and 20b formed between layers 21, 22, 23 of reinforcement fibers that have been infused or impregnated with a curable matrix resin. Each of the interlaminar regions 20a and 20b contains a curable matrix resin (24a, 24b, respectively) with carbon nanomaterials 25 dispersed therein and polymeric toughening particles 26 embedded in the same matrix resin. The resin composition (without nanomaterials and toughening particles) of the interlaminar resin 24a and 24b may be similar to or different from that of the matrix resin impregnating fiber layers 21, 22, 23. When the interlaminar resin (24a, 24b) is similar to that of the matrix resin impregnating fiber layers 21, 22, 23, the resin matrices contain one or more thermoset resins in common. The polymeric toughening particles 26 may be positioned side by side, and together form a single layer of particles. In this manner, the depth of the interlaminar region is determined by the sizes of the particles. Preferably, the toughening particles 26 are similar in size (e.g., spherical particles having approximately the same diameter) and the depth of the interlaminar region is about the same or slightly greater than the average diameter of the toughening particles 26.

Figure 4:
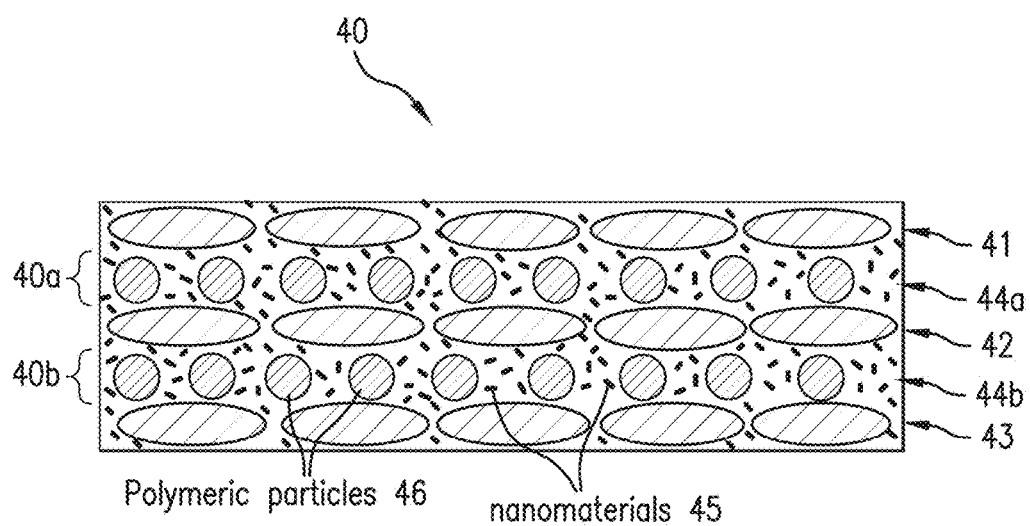
FIG. 4 schematically illustrates a curable composite material with interlaminar regions containing toughening particles and the carbon nano-materials uniformly dispersed into the matrix, according to another embodiment of the present disclosure.

FIG. 4 schematically illustrates a curable composite material 40 according to another embodiment of the present disclosure. The composite material 40 contains interlaminar regions 40a and 40b formed between layers 41, 42, 43 of reinforcement fibers, and the interlaminar regions contain polymeric toughening particles 46. The reinforcement fibers (41, 42, 43) and polymeric particles 46 are infused with or embedded within a curable matrix resin containing carbon nanomaterials 45 dispersed therein. As in the embodiment shown in FIG. 3, the polymeric particles 46 may be positioned side by side, and together form a single layer of particles. Moreover, the depth of the interlaminar region may be determined by the sizes of the particles. Preferably, the toughening particles 46 are similar in size (e.g., spherical particles having approximately the same diameter) and the depth of the interlaminar region is about the same or slightly greater than the average diameter of the toughening particles 46.

Upon curing, the cured composite materials, according to the embodiments disclosed herein, has the following properties: electrical conductivity in the z-direction greater than 1 S/m (siemens per meter) as measured in DC conditions according to a 4-probe testing method, CAI after impact at 30 J greater than 250 MPa as measured in accordance with ASTM7136/37 and interlaminar fracture toughness under mode I ($G_{Ic}$) of greater than 300 J/m² as measured in accordance to EN6033.

Carbon Nanomaterials

The term "carbon nanomaterials" or carbon-based, nano-sized structures as used herein, refers to materials having at least one dimension smaller than about 0.1 micrometer (<100 nanometers) and composed entirely or mostly of carbon atoms arranged, at the molecular scale, in pentagons or hexagons, or both.

The carbon nano-sized structures may have an aspect ratio from 50:1 to 5000:1. The term "aspect ratio" as used herein refers to the ratio of the longest dimension to the shortest dimension of a 3-dimensional body. This term is applicable to structures of any shape and size. When this term is used in relation to spherical or substantially spherical particles, the relevant ratio would be that of the largest cross sectional diameter to the smallest cross sectional diameter of the spherical body. As an example, a perfectly spherical particle would have an aspect ratio of 1:1.

Suitable carbon nano-sized structures for the intended purpose herein include, but are not limited to, carbon nano-tubes, carbon nano-fibres, carbon nano-ropes, carbon nano-ribbons, carbon nano-fibrils, carbon nano-needles, carbon nano-sheets, carbon nano-rods, carbon nano-cones, carbon nano-scrolls (scroll-like shapes) and carbon nano-ohms, carbon black, graphite nano-platelets or nano-dots, graphenes, and other types of fullerene materials. Any of these fullerene materials may have a partial or total metallic coating. Nano-particles can be of any suitable three-dimensional shapes including, for example, spherical, ellipsoidal, spheroidal, discoidal, dendritic, rods, discs, cuboid or polyhedral.

The preferred carbon nanomaterials are carbon nanotubes (CNTs). Typically, CNTs are tubular, strand-like structures having external diameters in the range of 0.4 nm to about 100 nm, preferably, the external diameter is less than 50 nm, and more preferably, less than 25 nm.

The CNTs may be of any chirality. Armchair nanotubes are contemplated. Moreover, the CNTs may be semiconducting nanotubes or any other type that displays electrical conductivity. Suitable CNTs may include single-walled carbon nano-tubes (SWCNTs), double-walled carbon nanotubes (DWCNTs) and multi-walled carbon nanotubes (MWCNTs). The preferred carbon nanomaterials are MWCNTs.

The carbon nano-materials for the intended purposes herein may be present in the range of 0.1 wt. % to 10 wt. % of the total resin content in the composite material, preferably between 0.5 wt. % to 2 wt. % and more preferably in the range 1 wt. % to 1.5 wt. %. As used herein, "wt. %" refers to percentage by weight.

Polymeric Toughening Particles

The polymeric toughening particles that are suitable for the purposes herein include thermoplastic or elastomeric particles. As discussed previously, suitable toughening particles are particles that are substantially insoluble in the thermoset matrix resin of the composite materials during curing thereof, and remain as discreet particles in the cured matrix resin after curing. In certain embodiments, the polymeric toughening particles are also swellable particles in the thermoset matrix resin of the composite material during curing. Moreover, the polymeric toughening particles do not have a non-polymeric coating such as metal.

It is preferred that the toughening particles are uniformly dispersed in the interlaminar region formed between adjacent layers of reinforcing fibers at a content of 2% to 20% based on the weight of the total matrix resin contained in the composite material, preferably within the range of 5% to 15%, and more preferably within the range of 5% to 12%.

The polymeric toughening particles may be of any three-dimensional shape, but it is preferred that they are substantially spherical. It is also preferred that the toughening particles have an aspect ratio of less than 5:1, preferably, the aspect ratio is about 1:1. With reference to spherical particles, the term "aspect ratio" refers to the ratio of the largest cross sectional dimension of the particle to the smallest cross sectional dimension of the particle.

For spherical particles (aspect ratio of approximately 1:1), the mean particle size refers to its diameter. For non-spherical particles, the mean particle size refers to the largest cross sectional dimension of the particles.

For the purposes disclosed herein, the polymeric toughening particles may have a mean particle size (d50) of less than 100 μm, preferably within the range of 50 μm-90 μm, more preferably 10 μm-40 μm, as measured by a laser diffraction technique, for example, using Malvern Mastersizer 2000 which operates in the 0.002 nanometer to 2000 micron range.

"d50" represents the median of the particle size distribution, or alternatively is the value on the distribution such that 50% of the particles have a particle size of this value or less.

Furthermore, the polymeric toughening particles are larger in size as compared to the carbon nano-structures. It is preferred that the mean particle size (d50) of the polymeric toughening particles is at least 100 times greater than the smallest dimension of the carbon nano-structure.

As an example, when the carbon nano-structures are carbon nanotubes, the mean particle size (d50) of the toughening particle is at least 100 times greater than the diameter of the carbon nanotubes.

Determining whether certain particles are insoluble or soluble relates to the solubility of the particles in a particular resin system in which they reside. The resin system may include one or more thermoset resins, curing agents and/or catalysts, and minor amounts of optional additives for modifying the properties of the uncured or cured matrix resin.

Hot stage microscopy can be used to determine if a particle is insoluble, partially soluble, or swellable in a resin system. First, a sample of dry polymeric particles (which are not combined with a resin) is characterized by microscopy and the images analyzed using ImageJ software from the National Institutes of Health (Bethesda, Md., USA) to determine the average particle size and volume. Second, a sample of particles is dispersed in the desired matrix resin via mechanical mixing. Third, a sample of the resulting mixture is placed on a microscope slide, which is then placed in a hot stage setup under a microscope. Then, the sample is heated to the desired cure temperature at the desired ramp rate, and any change in size, volume or shape of the particles is continuously recorded at 10 frames per second. The diameter is normally measured for spherical particle while the longest side is measured in case of non-spherical ones to determine changes in size and volume using the ImageJ software. All hot stage testing may be carried out at a particle loading of 10 wt. % in a matrix resin containing no curative or catalyst.

When toughening particles are subjected to the above hot stage microscopy analysis and the change in diameter or volume of the particle is zero or less than 5%, as compared to the original "dry" particles, then the particle is considered to be insoluble, and not swellable. When the toughening particle is subjected to the above hot stage microscopy analysis and there is an increase in diameter or volume of the particle by more than 5%, then the particle is considered to be "swellable" as well as insoluble. The swelling is caused by the infusion of the surrounding resin into the outer surface of the particle.

In some embodiments, insoluble particles include particles that melt during the hot stage microscopy analysis but are incompatible with the matrix resin, and therefore reform into discrete particles upon cooling. For analytical purposes only, the insoluble particles may flow during the hot stage microscopy analysis and the degree of crystallinity may also change.

In cases where the diameter or volume may be difficult to determine, an alternate analysis may be used. A 16-ply quasi-isotropic composite panel made from unidirectional prepreg tapes and containing a particle loading of 10% based on the weight of the total matrix resin in the resin-rich interlaminar regions may be manufactured according to a cure schedule, and then the cured panel is cut cross-sectionally for evaluation by microscopy. If the particles remain as discernable, discrete particle after curing, then the particles are considered to be insoluble particles. If the particles fully dissolve into both the interlaminar region and the matrix surrounding the fiber bed, and are not discernable as discrete particles upon cooling, then the particles are not considered insoluble interlaminar particles.

For epoxy-based matrix resin, the composition of insoluble polymeric particles may contain at least one polymer selected from: polyamideimide (PAI), aliphatic polyamides (PA), polyphthalamide (PPA), polyaryletherketones (PAEK), such as polyetheretherketone (PEEK) and polyetherketoneketone (PEKK), polyphenylene sulfide (PPS), liquid crystal polymers (LCPs), copolymers thereof, and derivatives thereof. In some embodiments, the composition of the polymeric particles contains at least one elastomeric polymer or material selected from: cross-linked polybutadiene, polyacrylic, polyacrylonitrile, polystyrene, copolymers thereof, and derivatives thereof (such as Duo-Mod DP5045 sold by Zeon Chemicals Inc).

In preferred embodiments, the insoluble particles are insoluble thermoplastic particles that do not dissolve during the curing process and remain within the interlaminar regions of the cured composite material. Examples of suitable insoluble thermoplastic particles include polyamideimide (PAI) particles and polyamide (PA) particles (e.g. nylon) or polyphthalamide (PPA) particles, which are insoluble in epoxy resin system during the curing cycle thereof.

Certain grades of polyimide particles may be suitable as insoluble toughening particles. For example, polyimides prepared from benzophenone tetracarboxylic acid dianhydride (BTDA), 4,4'-methylenedianiline (MDA), and 2,4-toluenediamine (TDA), and having a non-phthalimide carbon content which contains between 90 and 92 percent aromatic carbons.

Insoluble thermoplastic particles have been found to be effective as interlaminar tougheners for avoiding the loss of hot/wet performance. Because these thermoplastic particles remain insoluble in a matrix resin even after curing, they impart improved toughness, damage tolerance, hot/wet performance, processing, micro-cracking resistance, and reduced solvent sensitivity to the cured resin.

The methods of manufacturing the insoluble particles described herein may include, in any order emulsification, precipitation, emulsion polymerization, washing, drying, extrusion, milling, grinding, cryo-grinding, jet milling and/or sieving the particles. Those skilled in the art will appreciate that these steps can be achieved by any of numerous methods known in the art.

The insoluble particles used for the intended purposes herein include cross-linked thermoplastic particles. According to one embodiment, the cross-linked thermoplastic particle is composed of a crosslinking network created by reacting one or more crosslinkable thermoplastic polymers having one or more reactive groups with a crosslinking agent that is chemically reactive to the reactive groups, wherein the crosslinking agent directly crosslinks the polymer chains to each other via the reactive groups. The reactive groups may be end groups or pendant groups on the polymer backbone. The direct crosslinking reaction of this embodiment may be described as "tying-up" the polymer molecules via direct crosslinking of the polymer chains using one or more reactive groups.

The above crosslinked thermoplastic particles may be produced by the process as described in U.S. Patent Application with Publication No. 2010/0304118, published on Dec. 2, 2010, which is incorporated herein by reference. This method includes dissolving a thermoplastic polymer with reactive functional groups, a crosslinking agent, and a catalyst into a common solvent, which is immiscible with water. An emulsion is then created in water by using a non-ionic surfactant, whereby emulsified particles are formed. The emulsified particles are subsequently dried and cured so that the polymeric chains become chemically crosslinked. The reacting conditions and the type of crosslinking agent will determine the final properties of the particles. Reacting conditions such as temperature result in greater crosslinking. Crosslinking agents with two or more reactive sites (i.e. functional groups) are preferred. The resulting crosslinked thermoplastic particles are discreet, free-moving particles that may be added to a curable resin.

Examples of suitable thermoplastic polymers bearing reactive groups that are susceptible to crosslinking include, but are not limited to, one or more of a polyether, polycarbonate, polyetherimide (PEI), polyamide, polyimide, polysulfone, polyethersulfone (PES), poly phenylene oxide (PPO), poly ether ketones, polyaryletherketones (PAEK) such as polyetheretherketone (PEEK) and polyetherketoneketone (PEKK), polyphenyl sulfides (PPS), polyhydroxyethers, styrene-butadiene, polyacrylates, polyacetol, polybutyleneterephthalate, polyamide-imide, polyetherethersulfone (PEES), blends thereof, or a copolymer thereof, PES homopolymers (such as SUMIKAEXCEL 5003P from Sumitomo Chemical Co. or Radel® PES from Solvay), or PEES homopolymers. Specific examples of PES copolymers include PES/PEES copolymer with various repeat unit ratios. The thermoplastics listed above can be used as a single component to form a particle, or, when more than one thermoplastic polymer is used, a hybrid structure, or a hybrid particle, is formed.

In other embodiments, the crosslinked particles are formed from as a blend of thermoplastic polymers. In still other embodiments, the crosslinked particles described herein may be formed from a hybrid structure wherein two or more thermoplastic polymers are used.

The reactive groups on crosslinkable thermoplastic polymers may be one or more of the following: amine; hydroxyl; anhydride; glycidyl; carboxylic acid; maleimide; isocyanate; phenolic; nadimide; cyanate ester; acetylene; vinyl; vinyl ester; diene; or derivatives thereof. In some cases, unsaturations on the polymer chain might serve as cross-linking points (for acrylic and methacrylic family as well some insaturated rubbers, vinyl esters or unsaturated polyesters). The number of reactive groups may be a minimum of one reactive group per chain and, in some embodiments, is considered as the lowest fraction necessary to create a connected polymer backbone; a number around or greater than one is preferred to produce a tightly cross-linked polymer or inter-penetrating network. Polymers with functionalities greater than 2 will easily produce highly reacted gels.

Depending on the chemical nature of the thermoplastic polymer's end groups/functionalities, an appropriate multifunctional crosslinking agent with multiple reactive sites may be selected. Examples of such crosslinking agents are: alkylated melamine derivatives (e.g. CYMEL® 303), acid chlorides (e.g. 1,3,5 benzenetricarbonyl trichloride), multifunctional epoxies (e.g. ARALDITE® MY0500, MY721), carboxylic acids (e.g. benzenetetracarboxylic acid).

In another embodiment, the crosslinked particle is composed of an inter-penetrating polymer network (IPN), which is composed of thermoplastic polymer chains intertwined with an independent crosslinking network. The IPN is created by reacting one or more compounds (e.g. crosslinkable monomers or polymers) having one or more reactive groups with a cross-linking agent that is chemically reactive to the reactive groups in the presence of a thermoplastic polymer. The reaction (which occurs under certain cross-linking or curing conditions) causes the compounds to become cross-linked via the reactive groups, thereby forming an independent cross-linking network. As such, the thermoplastic polymer chains are intertwined with the independent cross-linking network at a molecular level to form an IPN. This approach may be described as "tying-up" the thermoplastic polymer chains via the formation of a separate and independent crosslinking network, thereby creating an inter-penetrating network. Thus, in this embodiment, the thermoplastic polymer does not need to have reactive groups thereon. This type of crosslinked particles may be produced by the process described in U.S. Patent Application with Publication No. 2010/0305239, published on Dec. 2, 2010, which is incorporated herein by reference. The resulting crosslinked thermoplastic particles are discreet particles that may be added to a curable resin.

As an example, a crosslinked particle with an IPN may be created by: (i) forming an emulsion containing a thermoplastic polymer, a multifunctional epoxy resin and an amine curing agent capable of cross-linking the epoxy resin; (ii) removing the solvent from the emulsion and collecting the condensate, which is in the form of solid particles; (iii) drying the particles followed by curing (e.g. by heating) so that the epoxy resin becomes cross-linked. As a result of curing, the cross-linked epoxy forms an IPN with the thermoplastic polymer in each particle.

Certain swellable, cross-linked thermoplastic particles are particularly suitable as interlaminar toughening particles. These cross-linked thermoplastic particles become swollen in an epoxy-based resin system during curing, but remain as discreet particles in the cured resin. The swelling is caused by the infusion of the surrounding resin into the outer surface of the particle.

These swellable, cross-linked thermoplastic particles also form a "gradient interface" with the surrounding matrix resin in which they reside during curing. The term "gradient interface" as used herein refers to the gradual and strong interface between each of the particles and the surrounding matrix resin. A gradient interface is achieved by using engineered crosslinked thermoplastic particles that are thermodynamically compatible with the thermoset resin, e.g. epoxy. The concentration of thermoplastic polymer in the core of a cross-linked thermoplastic particle is greatest at the center and gradually decreases towards the outer surface of the particle as the matrix resin enters the particle from the outer surface and moves towards the core. This gradual decrease in the thermoplastic concentration from the core to the outer surface of the thermoplastic particle forms the gradient interface between each of the thermoplastic particles and the surrounding matrix resin. Thus, there is no sharp delineation or transition between the thermosetting resin and the thermoplastic particle. If a sharp delineation or transition was present, the interface between the thermoplastic and the thermosetting resin would be much weaker in a composite material in comparison to a composite material containing a gradient interface. As such, these crosslinked thermoplastic particles are considered "swellable" because the resin, which surrounds the particle, diffuses into the particles through the particle's outer surface when the resin is heated and its viscosity is reduced, thereby resulting in an increase in the particle size. However, the crosslinked particles will remain as discrete and discernable particles after curing of the resin.

The cross-linked thermoplastic particles described herein are discreet, free-moving particles (i.e. in divided state) that may be added to a thermosettable resin, such as an epoxy-based resin, and they are chemically cross-linked in order to prevent their total dissolution in the resin during the cure cycle of the resin. Furthermore, they are designed to be thermodynamically compatible with the thermoset resin.

"Discrete particle" as used herein refers to a particle which is discernible in a matrix resin, and which may be detected by using Scanning Electron Microscopy (SEM), Optical Microscopy, or Differential Interference Contrast microscopy (DIC).

Matrix Resin

The curable matrix resin (or resin composition) for impregnating/infusing the reinforcement fibers is preferably a hardenable or thermosettable resin containing one or more uncured thermoset resins, which include, but are not limited to, epoxy resins, imides (such as polyimide or bismaleimide), vinyl ester resins, cyanate ester resins, isocyanate modified epoxy resins, phenolic resins, furanic resins, benzoxazines, formaldehyde condensate resins (such as with urea, melamine or phenol), polyesters, acrylics, hybrids, blends and combinations thereof.

Suitable epoxy resins include polyglycidyl derivatives of aromatic diamine, aromatic mono primary amines, aminophenols, polyhydric phenols, polyhydric alcohols, polycarboxylic acids. Examples of suitable epoxy resins include polyglycidyl ethers of the bisphenols such as bisphenol A, bisphenol F, bisphenol S and bisphenol K; and polyglycidyl ethers of cresol and phenol based novolacs.

Specific examples are tetraglycidyl derivatives of 4,4'-diaminodiphenylmethane (TGDDM), resorcinol diglycidyl ether, triglycidyl-p-aminophenol, triglycidyl-m-aminophenol, bromobisphenol F diglycidyl ether, tetraglycidyl derivatives of diaminodiphenylmethane, trihydroxyphenyl methane triglycidyl ether, polyglycidylether of phenolformaldehyde novolac, polyglycidylether of o-cresol novolac or tetraglycidyl ether of tetraphenylethane.

Commercially available epoxy resins suitable for use in the the host matrix resin include N,N,N',N'-tetraglycidyl diamino diphenylmethane (e.g. MY 9663, MY 720, and MY 721 from Huntsman); N,N,N',N'-tetraglycidyl-bis(4-aminophenyl)-1,4-diiso-propylbenzene (e.g. EPON 1071 from Momentive); N,N,N',N'-tetraclycidyl-bis(4-amino-3,5-dimethylphenyl)-1,4-diisopropylbenzene, (e.g. EPON 1072 from Momentive); triglycidyl ethers of p-aminophenol (e.g. MY 0510 from Hunstman); triglycidyl ethers of m-aminophenol (e.g. MY 0610 from Hunstman); diglycidyl ethers of bisphenol A based materials such as 2,2-bis(4,4'-dihydroxy phenyl) propane (e.g. DER 661 from Dow, or EPON 828 from Momentive, and Novolac resins preferably of viscosity 8-20 Pa·s at 25° C.; glycidyl ethers of phenol Novolac resins (e.g. DEN 431 or DEN 438 from Dow); di-cyclopentadiene-based phenolic novolac (e.g. Tactix 556 from Huntsman); diglycidyl 1,2-phthalate (e.g. GLY CEL A-100); diglycidyl derivative of dihydroxy diphenyl methane (Bisphenol F) (e.g. PY 306 from Huntsman). Other epoxy resins include cycloaliphatics such as 3',4'-epoxycyclohexyl-3,4-epoxycyclohexane carboxylate (e.g. CY 179 from Huntsman).

Generally, the curable matrix resin contains one or more thermoset resins in combination with other additives such as curing agents, curing catalysts, co-monomers, rheology control agents, tackifiers, inorganic or organic fillers, thermoplastic and/or elastomeric polymers as toughening agents, stabilizers, inhibitors, pigments, dyes, flame retardants, reactive diluents, and other additives well known to those skilled in the art for modifying the properties of the matrix resin before or after curing.

Suitable toughening agents for the curable resin composition include but are not limited to homopolymers or copolymers either alone or in combination of polyamides, copolyamides, polyimides, aramids, polyketones, polyetherimides (PEI), polyetherketones (PEK), polyetherketoneketone (PEKK), polyetheretherketones (PEEK), polyethersulfones (PES), polyetherethersulfones (PEES), polyesters, polyurethanes, polysulphones, polysulphides, polyphenylene oxide (PPO) and modified PPO, poly(ethylene oxide) (PEO) and polypropylene oxide, polystyrenes, polybutadienes, polyacrylates, polymethacrylates, polyacrylics, polyphenylsulfone, high performance hydrocarbon polymers, liquid crystal polymers, elastomers and segmented elastomers.

The addition of curing agent(s) and/or catalyst(s) in the curable matrix resin is optional, but the use of such may increase the cure rate and/or reduce the cure temperatures, if desired. The curing agent is suitably selected from known curing agents, for example, aromatic or aliphatic amines, or guanidine derivatives. An aromatic amine curing agent is preferred, preferably an aromatic amine having at least two amino groups per molecule, and particularly preferable are diaminodiphenyl sulphones, for instance where the amino groups are in the meta- or in the para-positions with respect to the sulphone group. Particular examples are 3,3'- and 4-,4'-diaminodiphenylsulphone (DDS); methylenedianiline; bis(4-amino-3,5-dimethylphenyl)-1,4-diisopropylbenzene; bis(4-aminophenyl)-1,4-diisopropylbenzene; 4,4'methylenebis-(2,6-diethyl)-aniline (MDEA from Lonza); 4,4'methylenebis-(3-chloro, 2,6-diethyl)-aniline (MCDEA from Lonza); 4,4'methylenebis-(2,6-diisopropyl)-aniline (M-DIPA from Lonza); 3,5-diethyl toluene-2,4/2,6-diamine (D-ETDA 80 from Lonza); 4,4'methylenebis-(2-isopropyl-6-methyl)-aniline (M-MIPA from Lonza); 4-chlorophenyl-N,N-dimethyl-urea (e.g. Monuron); 3,4-dichlorophenyl-N, N-dimethyl-urea (e.g. DIURON™) and dicyanodiamide (e.g. AMICURE™ CG 1200 from Pacific Anchor Chemical).

Suitable curing agents also include anhydrides, particularly polycarboxylic anhydrides, such as nadic anhydride, methylnadic anhydride, phthalic anhydride, tetrahydrophthalic anhydride, hexahydrophthalic anhydride, methyltetrahydrophthalic anhydride, endomethylenetetrahydrophtalic anhydride, and trimellitic anhydride.

The curable matrix resin at the interlaminar region is also a hardenable or thermosettable resin containing one or more uncured thermoset resins of the type discussed above. In certain embodiments, the curable matrix resin at the interlaminar region is the same as the matrix resin in the region containing the reinforcement fibers. In other embodiments, the resin at the interlaminar region is different from the matrix resin in the region containing the reinforcement fibers.

Reinforcement Fibers

For fabricating high-performance composite materials and prepregs, suitable reinforcing fibres are but not limited to fibers having a high tensile strength, preferably greater than 500 ksi (or 3447 MPa). Fibers that are useful for this purpose include carbon or graphite fibres, glass fibres and fibres formed of silicon carbide, alumina, boron, quartz, and the like, as well as fibres formed from organic polymers such as for example polyolefins, poly(benzothiazole), poly(benzimidazole), polyarylates, poly(benzoxazole), aromatic polyamides, polyaryl ethers and the like, and may include mixtures having two or more such fibres. Preferably, the fibers are selected from glass fibers, carbon fibers and aromatic polyamide fibers, such as the fibers sold by the DuPont Company under the trade name KEVLAR. The reinforcement fibers may be used in the form of discontinuous or continuous tows made up of multiple filaments, as continuous unidirectional or multidirectional tapes, or as woven, non-crimped, or nonwoven fabrics. The woven form may be selected from plain, satin, or twill weave style. The non-crimped fabric may have a number of plies and fiber orientations.

Fibres may be sized or unsized. Fibres can be added typically at a concentration of 5 to 35, preferably at least 20%, by weight. For structural applications, it is preferred to use continuous fibre for example glass or carbon, especially at 30 to 70, more especially 50 to 70% by volume.

Manufacturing of Composite Prepreg and Laminates

According to one embodiment, specific amounts of carbon nanomaterials and polymeric toughening particles are mixed with curable resin composition prior to impregnation of reinforcement fibers (i.e. prior to the prepreg manufacturing). In this embodiment, a resin film is manufactured first by coating the particle-containing resin composition onto a release paper. Next, one or two of such resin film is/are laminated onto one or both sides of a layer of reinforcement fibers under the aid of heat and pressure to impregnate the fibers, thereby forming a fibre-reinforced polymer layer (or prepreg ply) with specific fiber areal weight and resin content. During the laminating process, the toughening particles are filtered out and remain external to the fibre layer due to the fact that the size of the particles is larger than the spacing between the fibre filaments. The resulting prepreg ply contains a structural fiber-reinforced layer adjacent to one or two layers of matrix resin in which the polymeric toughening particles are embedded. Subsequently, when two or more prepreg plies containing toughening particles therein are laminated one on top of the other via a laying up process, the toughening particles are positioned in the interlaminar region between two adjacent fiber layers. In this embodiment, the matrix resin at the interlaminar region (without polymeric toughening particles) is the same as the matrix resin contained in the structural fiber-reinforced layer and contains uniformly dispersed carbon nanomaterials.

In a second embodiment, a curable matrix resin without carbon nanomaterials or polymeric toughening particles is coated onto a release paper to form a resin film. This resin film is then brought into contact with one side of a fiber layer. Upon application of pressure, the resin film impregnates the fibers and leaves a little or no resin on the external surfaces of the fiber layer. Subsequently, a film of curable resin containing carbon nanomaterials and polymeric toughening particles is laminated to an exposed outer surface of the resin-impregnated fiber layer. The curable resin carrying the nanomaterials and polymeric toughening particles may be the same as or different from the matrix resin impregnating the reinforcement fibers. As a result, a particle-containing resin layer remains outside of the impregnated fiber layer and does not further impregnate the fibers. A plurality of such structures are laminated together to form a composite structure with carbon nanomaterials and polymeric toughening particles positioned in the interlaminar regions.

In a third embodiment, a curable matrix resin containing carbon nanomaterials but no polymeric toughening particles is coated onto a release paper to form a resin film. This resin film is then brought into contact with one side of a fiber layer. Upon application of pressure, the resin film impregnates the fibers and leaves a little or no resin on the external surfaces of the fiber layer. Subsequently, a film of curable matrix resin containing carbon nanomaterials and polymeric toughening particles is laminated to an exposed, outer surface of the resin-impregnated fiber layer. When a plurality of such structures are laminated together to form a composite structure, carbon nanomaterials are uniformly dispersed in the layer containing the reinforcing fibers and in the interlaminar regions containing the toughening interlaminar particles.

Figure 5:
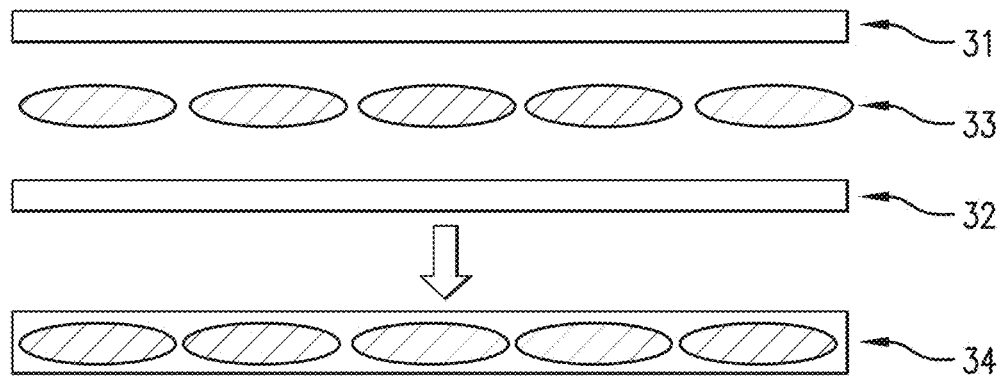
FIG. 5 and FIG. 6 illustrate a method for fabricating a composite material according to one embodiment.
Figure 6:
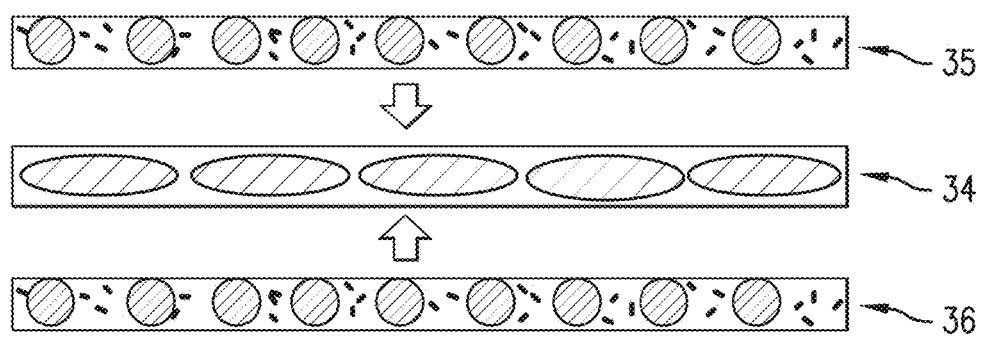

In another embodiment, as illustrated by FIG. 5, two films 31, 32 of curable matrix resin without carbon nanomaterials or toughening interlaminar particles are laminated to two opposing surfaces of a fiber layer 33. The resin films 31, 32 impregnate the fibers and leave little or no resin on the external surfaces of the fiber layer, resulting in resin-impregnated fiber layer 34. Subsequently, two films 35, 36 of curable matrix resin containing carbon nanomaterials and polymeric toughening particles are brought into contact with opposing surfaces of the resin-impregnated fiber layer 34, as illustrated by FIG. 6, to form a sandwich structure. Such approach tends to produce a well-defined and regular interlaminar region in the cured laminate.

Figure 7:
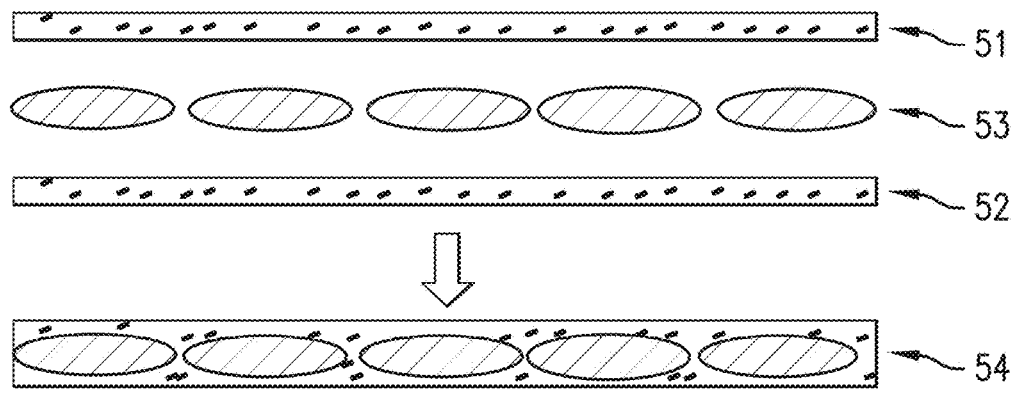
FIG. 7 and FIG. 8 illustrate a method for fabricating a composite material according to another embodiment of the present disclosure.
Figure 8:
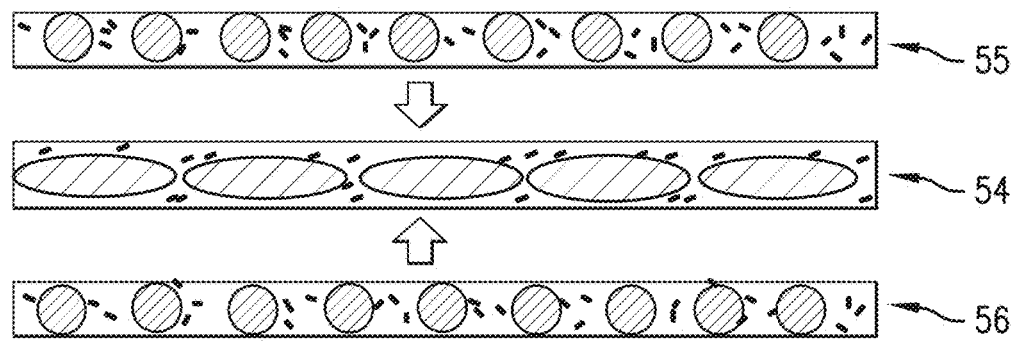

In a further embodiment, as illustrated by FIG. 7, the two films 51, 52 of curable matrix resin containing carbon nanomaterials but no polymeric toughening particles are laminated to two opposing surfaces of a fiber layer 53. The resin films 51, 52 impregnate the fibers and leave little or no resin on the external surfaces of the fiber layer, resulting in resin-impregnated fiber layer 54. Subsequently, two films 55 and 56 of curable matrix resin containing carbon nanomaterials and polymeric toughening particles are brought into contact with opposing surfaces of the resin-impregnated fiber layer 54, as illustrated by FIG. 8, to form a sandwich structure. Such approach tends to provide a well-ordered laminate and carbon nanotubes uniformly dispersed in the laminate.

The term "prepreg" as used herein refers to a sheet or layer of fibres that has been impregnated with a curable resin composition within at least a portion of the fibrous volume. The prepreg used for manufacturing aerospace structures is usually a resin-impregnated sheet of uni-directional reinforcing fibres, e.g. carbon fibers, which is often referred to as "tape" or "uni-directional tape". The prepregs may be fully impregnated prepregs or partially impregnated prepregs. The matrix resin impregnating the reinforcement fibers may be in a partially cured or uncured state.

Typically, the prepreg is in a pliable or flexible form that is ready for laying up and molding into a three-dimensional configuration, followed by curing into a final composite part/structure. This type of prepregs is particularly suitable for manufacturing load-bearing structural parts, such as wings, fuselages, bulkheads and control surfaces of aircrafts. Important properties of the cured prepregs are high strength and stiffness with reduced weight.

To form a composite structure, a plurality of prepreg plies may be laid up on a tool in a stacking sequence to form a "prepreg lay-up." The prepreg plies within the layup may be positioned in a selected orientation with respect to one another, e.g. 0°, ±45°, 90°, etc. Prepreg lay-ups may be manufactured by techniques that may include, but are not limited to, hand lay-up, automated tape layup (ATL), advanced fibre placement (AFP), and filament winding.

Curing of the composite material or prepreg layup disclosed herein is generally carried out at elevated temperature up to 200° C., preferably in the range of 170° C.-190° C., and with use of elevated pressure to restrain deforming effects of escaping gases, or to restrain void formation, suitably at pressure of up to 10 bar (1 MPa), preferably in the range of 3 bar (0.3 MPa) to 7 bar (0.7 MPa). Preferably, the cure temperature is attained by heating at up to 5° C./min, for example 2° C./min to 3° C./min and is maintained for the required period of up to 9 h, preferably up to 6 h, for example 2 h to 4 h. The use of a catalyst in the matrix resin may allow even lower cure temperatures. Pressure is released throughout, and temperature is reduced by cooling at up to 5° C./min, for example up to 3° C./min. Post-curing at temperatures in the range of 190° C. to 350° C. and atmospheric pressure may be performed, employing suitable heating rates to improve the glass transition temperature of the matrix resin.

Applications

The compositions described herein can be used to manufacture cast or moulded structural materials, and are particularly suitable for fabrication of fibre-reinforced load-bearing or impact-resisting composite structures with improved volume electrical conductivity.

The composite materials disclosed herein are applicable to the manufacture of components for transport applications, including aerospace, aeronautical, nautical and land vehicles, automotive, and railroad. For examples, the composite materials may be used for fabricating primary and secondary aircraft structures, space and ballistics structures. Such structural components include composite wing structures. The composite materials disclosed herein also find utility in building and construction applications, as well as other commercial applications. Notably, the composite materials are particularly suitable for the fabrication of load-bearing or impact-resisting structures.

EXAMPLES

Measurement Methods

The disclosed compositions were characterized according to the methods described below:

Volume Electrical Conductivity—z Direction

The electrical conductivity in the direction orthogonal to the surface the cured composite laminates was measured by means of a Burster-Resistomat 2316 milliohmmeter recording resistance values as the ratio between the applied voltage and current in a bridge method. Kelvin test Probes were used to create a contact between the two sample surfaces. All measurements were carried out in accordance with the 4-wire measurement method at RT in standard humidity conditions.

Measurements were performed on coupons extracted from defect free quasi-isotropic panels prepared in accordance with EN 2565 method B. Approximately 3 mm thick square samples were characterized.

Composite specimen surfaces were prepared by removing the top resin rich layer to expose the carbon fibers underneath ensuring a direct contact with the electrode. Then a commercial silver paste was used to create two electrodes on opposite coupon surfaces.

A minimum of 5 samples per material and lay-up were tested.

DC electrical conductivity was calculated in [S/m] in according to the following equation:

$$\sigma_v = \frac{1}{R} \cdot \frac{l}{S}$$

where:
R is the measured resistance [in Ohm];
l is the sample thickness [in m];
S is the sample surface area [in m$^2$]

Mechanical Characterization

Compression after impact (CAI) after a 30 Joule impact was determined using 24-ply quasi-isotropic laminates. Measurements were performed at room temperature on coupons extracted from defect free panels prepared in accordance with EN 2565 method B and cured for 2 hours at 180° C. The specimens were machined, impacted and tested in accordance with ASTM7136/37.

Inter-laminar fracture toughness in mode I was determined using a 16-ply unidirectional laminate cured with a fluoro-ethylene polymer (FEP) film as crack starter at the mid plane. $G_{Ic}$ measurements were performed at room temperature according to EN6033 on coupons extracted from defect free panels.

Comparative Example 1

Effect of Polymeric Toughening Particles on Composite Materials

Matrix resins with polymeric toughening particles (1a, 1b, 1c and 1d) and without polymeric toughening particles (Control 1) were prepared according to the formulations shown in Table 1. All amounts are shown in weight percentage (w/w %) based on the weight of the formulation.

TABLE 1

Curable matrix resin compositions

| Resin component | Resin composition (w/w %) | | | | |
|---|---|---|---|---|---|
| | Control 1 | 1a | 1b | 1c | 1d |
| Araldite ® PY 306 | 26.3 | 22.8 | 22.8 | 22.8 | 22.8 |
| Araldite ® MY 0510 | 26.3 | 23.2 | 23.2 | 23.2 | 23.2 |
| SUMIKAEXCEL 5003P | 19.5 | 16.7 | 16.7 | 16.7 | 16.7 |
| 4,4'- DDS | 28.2 | 24.2 | 24.2 | 24.2 | 24.2 |
| Particle A | — | 11.8 | — | — | — |
| Particle B | — | — | 11.8 | — | — |
| Particle C | — | — | — | 11.8 | — |
| Particle D | — | — | — | — | 11.8 |

In Table 1, Araldite® PY 306 is a Bisphenol F diglycidyl ether resin available from Huntsman, Araldite® MY 0510 is a triglycidyl ether of p-aminophenol resin available from Huntsman, and SUMIKAEXCEL 5003P is a polyethersulfone polymer available from Sumitomo Chemical Co. Particle A is an aromatic polyimide with a glass transition temperature of approximately 340° C. and a mean particle size of 40 microns, and is sold under the tradename P84 from Evonik. Particle B is a polyphthalamide with a melting point of approximately 250° C. and a mean particle size of 35 microns, sold under the trade name Vestamid® TGP3551 from Evonik. Particle C is a swellable, cross-linked PES-PEES particle with a mean particle size of 25 microns from Cytec Industries Inc. Particle D is an aliphatic nylon particle with a mean particle size of 25 microns supplied by Evonik under the trade name of VESTOSINT® Z2649.

The matrix was prepared by dispersing the 5003P in the epoxy constituents and heating at 125° C. for approximately 1 hour to dissolve the 5003P. The resulting mixture was cooled to 80° C., and then the remaining constituents were added and mixed thoroughly.

The resin compositions were then used to produce different unidirectional (UD) prepregs. Each of the curable resin compositions disclosed in Table 1 was used to manufacture a resin film by coating the resin composition onto a release paper. Next, two of such resin films were laminated onto both sides of a continuous layer of unidirectional carbon fibers (IMS65E from Toho Tenax, USA), with the aid of heat and pressure, to form a UD prepreg. Each resulting prepreg had an average FAW (fiber areal weight) of 197 gsm and 35% w/w resin content based on the total prepreg weight. Test composite laminates were prepared from the prepregs in accordance with the EN2565 method discussed above.

Mechanical Results

The test composite laminates were subjected to mechanical testing and the results are shown in Table 2. As seen in Table 2, cured composite laminates with interlaminar polyimide, polyphthalamide, cross-linked PES-PEES or polyamide toughening particles between fiber layers yielded an improvement in the damage tolerance (CAI at 30 J) and inter-laminar fracture toughness ($G_{Ic}$) values as compared to Control 2 (baseline without toughening particles).

TABLE 2

Mechanical results of baseline and particle-toughened composites

| Cured Laminate code | Matrix resin code | CAI [30 J] [MPa] | $G_{Ic}$ [J/m²] |
|---|---|---|---|
| Control 2 | Control 1 | 226.0 | 289.0 |
| 2a | 1a | 258.8 | 314.7 |
| 2b | 1b | 232.1 | 333.2 |
| 2c | 1c | 282.4 | 309.9 |
| 2d | 1d | 278.7 | 390.2 |

Electrical Results

The z-direction volume conductivity of the cured composite laminates was also measured and the results are shown in Table 3.

Conversely to the mechanical results of Table 2, the inclusion of interlaminar polymeric toughening particles in cured composite laminates yielded a dramatic reduction in the z-direction DC conductivity if compared to composites without a well-defined inter-laminar region (Control 2). This reduction is mainly due to the dielectric nature of the polymeric toughening particles. For example, the addition of Particle C to the baseline system reduced the z-direction conductivity of the cured laminate 2c by almost one order of magnitude as compared to the unmodified baseline (Control 2).

TABLE 3

Electrical results.

| Cured Laminate code | Matrix resin code | Volume conductivity [S/m] |
|---|---|---|
| Control 2 | Control 1 | 0.77 |
| 2a | 1a | 0.26 |
| 2b | 1b | 0.49 |
| 2c | 1c | 0.12 |
| 2d | 1d | 0.14 |

Example 2

Effect of Polymeric Toughening Particles on CNT-Modified Composite Materials

The same curable resin compositions disclosed in Table 1 of Example 1 were modified by dispersing between 1.35% and 1.55% by weight of multi-walled carbon nanotubes (MWCNTs) having carbon purity >98%, an average diameter of 15 nm, and an average length of about 1 mm. The MWCNT-modified resin compositions are shown in Table 4. All amounts are shown in weight percentage (w/w %) based on the weight of the formulation.

TABLE 4

MWCNT- modified resin compositions

| | Resin composition (w/w %) | | | | |
|---|---|---|---|---|---|
| Resin component | Control 3 | 3a | 3b | 3c | 3d |
| Araldite PY306 | 25.8 | 22.8 | 22.8 | 22.8 | 22.8 |
| Araldite MY0510 | 25.8 | 23.2 | 23.2 | 23.2 | 23.2 |
| Sumikaexel 5003P | 19.1 | 16.7 | 16.7 | 16.7 | 16.7 |
| 4,4'- DDS | 27.7 | 24.2 | 24.2 | 24.2 | 24.2 |
| Particle A | — | 11.8 | — | — | — |
| Particle B | — | — | 11.8 | — | — |
| Particle C | — | — | — | 11.8 | — |
| Particle D | — | — | — | — | 11.8 |
| MWCNT | 1.55 | 1.35 | 1.35 | 1.35 | 1.35 |

Curable matrix resins were prepared based on the formulations of Table 4. The matrix resins were then used to make UD carbon fiber-reinforced prepregs in accordance with the same manufacturing method described in Example 1. Each prepreg had an average FAW of 197 gsm and 35% w/w resin content, based on the total prepreg weight. Test composite laminates were prepared from the prepregs in accordance with the EN2565 method discussed above.

Mechanical Results

The test composite laminates were subjected to mechanical testing and the results are shown in Table 5. The mechanical results reported in Table 5 show that the introduction of polymeric toughening particles in combination with MWCNTs in the matrix resin can yield significant improvements in CAI (at 30 J) and $G_{Ic}$ values as compared to otherwise identical materials modified only with MWCNTs (Control 4) or having no polymeric toughening particles (Control 2).

TABLE 5

Mechanical results

| Laminates code | Matrix resin code | CAI [30 J] [MPa] | $G_{Ic}$ [J/m²] |
|---|---|---|---|
| Control 4 | Control 3 | 240.2 | 291.9 |
| 4a | 3a | 291.4 | 451.7 |
| 4b | 3b | 285.6 | 433.1 |
| 4c | 3c | 295.9 | 348.9 |
| 4d | 3d | 287.4 | 636.5 |

It is believed that the simultaneous improvement in the two mechanical properties—CAI [30 J] and $G_{Ic}$—is the result of a synergistic effect between MWCNTs and the polymeric toughening particles.

Figure 9A:
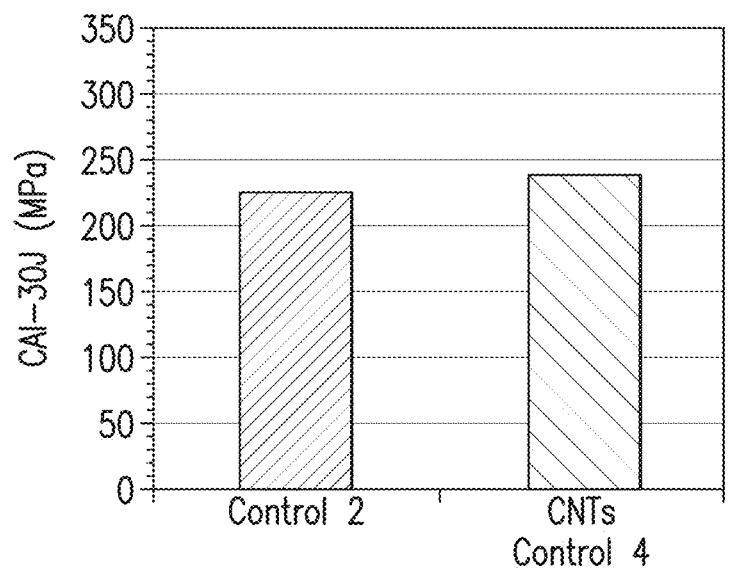
FIGS. 9A and 9B show the mechanical properties of a composite laminate modified with carbon nanotubes (CNTs) versus those of an unmodified composite laminate.
Figure 9B:
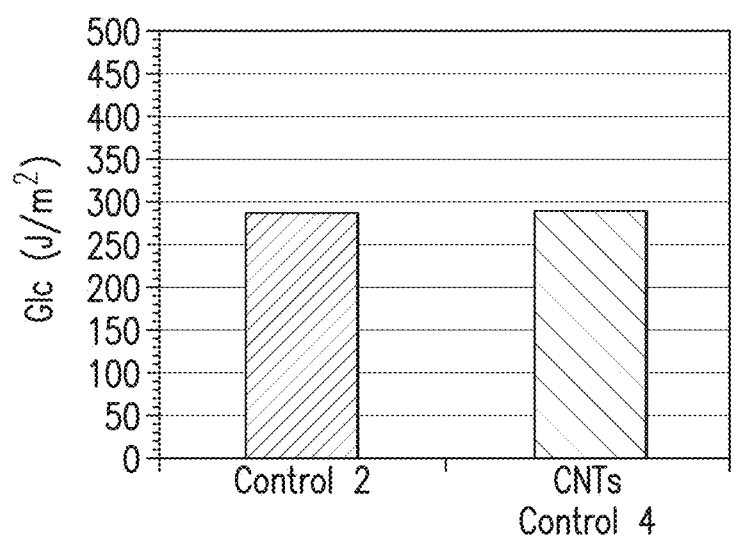

FIGS. 9A and 9B show that the addition of MWCNTs to laminates without polymeric toughening particles (Control 4), did not yield any significant improvement in CAI and $G_{Ic}$ performance as compared to the unmodified laminate (Control 2).

Figure 10A:
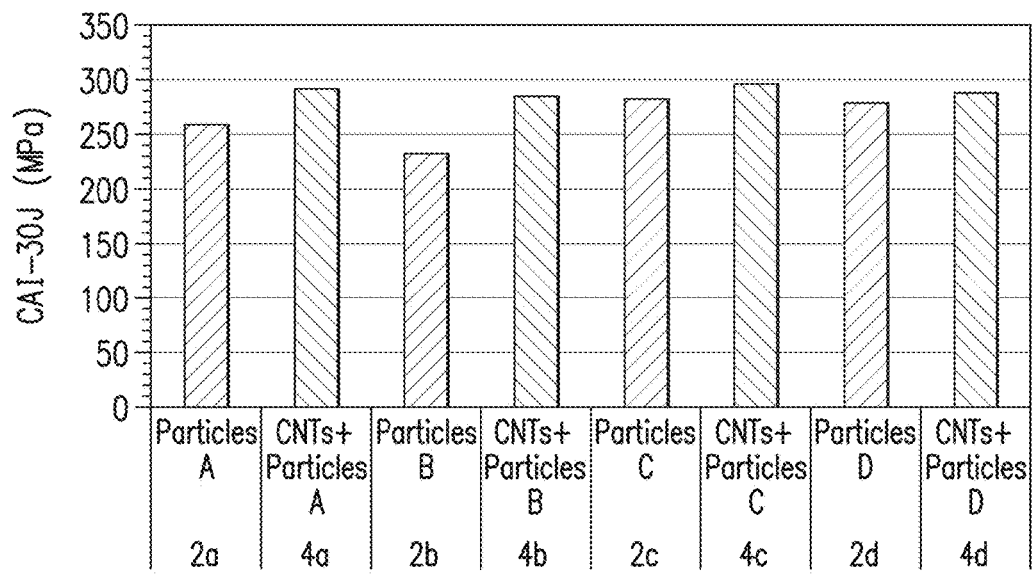
FIGS. 10A and 10B show effect of different polymeric toughening particles on the mechanical properties of CNT-modified composite materials.
Figure 10B:
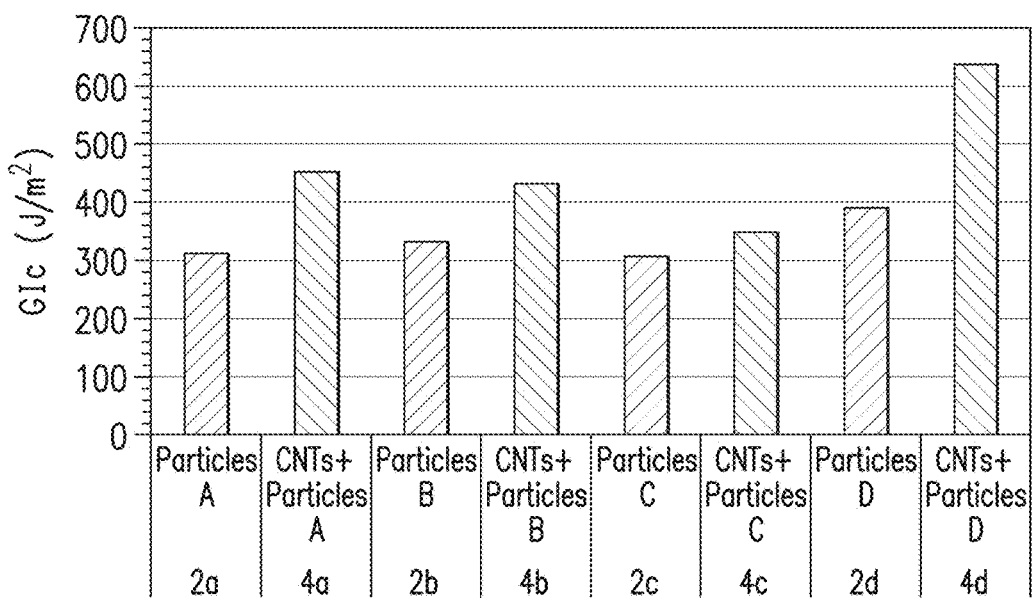

FIGS. 10A and 10B shows that the addition of MWCNTs in laminates containing polymeric toughening particles (Laminates 4a, 4b, 4c and 4d) resulted in higher CAI and $G_{Ic}$ values as compared to the same laminates without MWCNTs (Laminates 2a, 2b, 2c and 2d).

Figure 11:
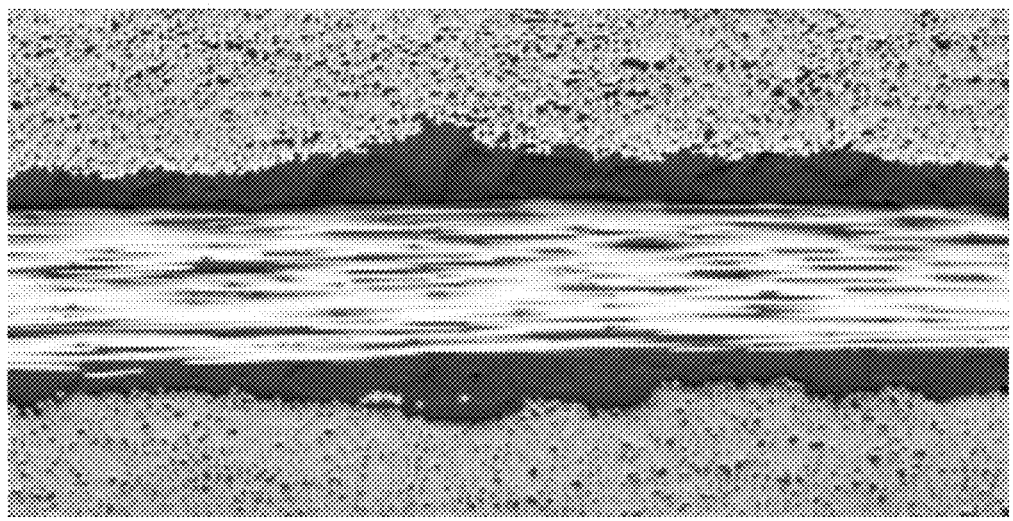
FIG. 11 shows a micrograph image of the cross-section of a cured laminate (4b) containing CNTs and polyphthalamide particles.

FIG. 11 is a micrograph image of a cross section of the cured laminate 4b, which contains MWCNTs and polyphthalamide particles (Particle B). As can be seen from FIG. 11, the polymeric particles are dispersed in the resin-rich layer creating a well-defined ductile inter-laminar region between the fiber layers.

Electrical Conductivity Results

Table 7 reports the average z direction conductivity values of the MWCNT-modified laminates with interlaminar polymeric particles (Laminates 4a, 4b, 4c and 4d) and the laminate without interlaminar polymeric particles (Control 4).

TABLE 7

Z-direction DC electrical conductivity results

| Laminates code | Matrix Resin Code | Volume conductivity [S/m] |
|---|---|---|
| Control 4 | Control 3 | 6.00 |
| 4a | 3a | 5.80 |
| 4b | 3b | 23.94 |
| 4c | 3c | 12.23 |
| 4d | 3d | 23.95 |

Figure 12:
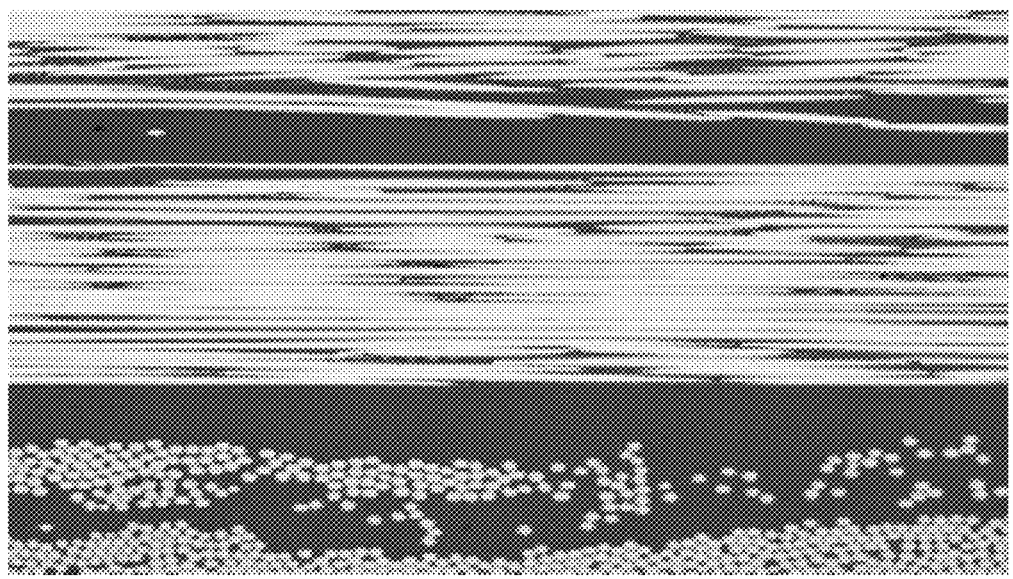
FIG. 12 shows a micrograph image of the cross-section of a cured laminate (4a) containing CNTs and aromatic polyimide particles.

It was observed that the addition of Particle A, which is soluble in the matrix resin (3a) upon curing, has a neutral effect on z-direction conductivity values. FIG. 12 is a micrograph of the cross section of the cured laminate 4a, which contains MWCNTs and aromatic polyimide particles (Particle A).

Surprisingly, the addition of insoluble particles (Particles B and D), and swellable particles (Particle C) yielded better electrical performance than that of the laminate modified with only MWCNTs (Control 4). This result is surprising since the addition of insulating elements into the interlaminar region was traditionally expected to substantially decrease the volume conductivity of the cured composite as in the case of the corresponding laminates without MWCNTs (see Example 1, Table 3, Laminates 2a, 2b, 2c and 2d). It is remarkable that such improvement was achieved by reducing the overall MWCNT content in the resin system from 1.55% w/w (Control 3) to 1.35% w/w (Matrix resins 3b, 3c and 3d).

Figure 13:
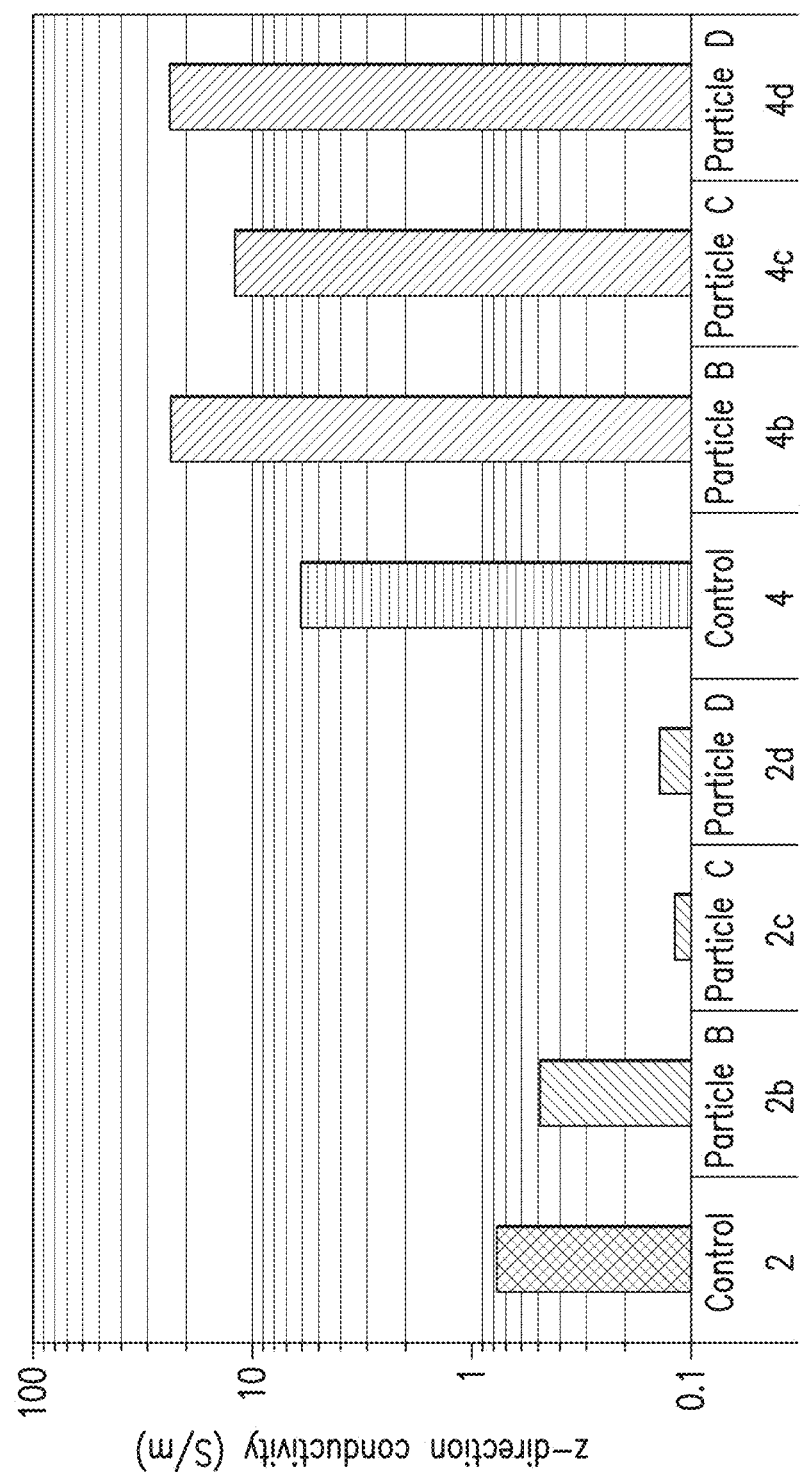
FIG. 13 shows the effect of different polymeric toughening particles on the z-direction DC conductivity of CNT-modified composite laminates and on those not modified with CNTs.

FIG. 13 shows the z-direction conductivity for the laminates Control 2, 2b, 2c, 2d, Control 4, 4b, 4c and 4d. As shown in FIG. 13, the addition of insoluble and swellable cross-linked particles reduced the z-direction conductivity of unmodified laminates, while the addition of the same polymeric toughening particles in laminates including MWCNTs resulted in improved z-direction conductivity values.

Example 3

Effect of Insoluble Elastomeric Particles on CNT-Modified Composite Materials

A matrix resin with insoluble elastomeric particles (Control 5) was prepared according to the formulation shown in Table 8. The same curable resin composition was modified by dispersing 1.35% by weight of multi-walled carbon nanotubes (MWCNTs) having carbon purity >98%, an average diameter of 15 nm, and an average length of about 1 mm. The MWCNT-modified resin composition (5a) is shown in Table 8. All amounts are shown in weight percentage (w/w %) based on the weight of the formulation.

TABLE 8

Curable matrix resin compositions

| | Resin composition (w/w %) | |
|---|---|---|
| Resin component | Control 5 | 5a |
| Araldite ® PY 306 | 24.9 | 24.4 |
| Araldite ® MY 0510 | 24.9 | 24.4 |
| SUMIKAEXCEL 5003P | 18.1 | 18.1 |
| 4,4'- DDS | 26.1 | 25.75 |
| Particles E | 6.0 | 6.0 |
| MWCNT | — | 1.35 |

In Table 8, Araldite® PY 306 is a Bisphenol F diglycidlyl ether resin available from Huntsman, Araldite® MY 0510 is a triglycidyl ether of p-aminophenol resin available from Huntsman, and SUMIKAEXCEL 5003P is a polyethersulfone polymer available from Sumitomo Chemical Co. Particles E is carboxyl functional elastomer in powder form with a glass transition temperature of approximately −5° C. and a mean particle size of 50 microns, and is sold under the trade name DuoMod® DP5045 from Zeon Chemicals L.P.

Resin matrices were prepared by dispersing the 5003P thermoplastic in the epoxy constituents and heating at 125° C. for approximately 1 hour to dissolve the 5003P thermoplastic. The resulting mixture was cooled to 80° C., and then the remaining constituents were added and mixed thoroughly.

The resin compositions were then used to produce different unidirectional (UD) prepregs. Each of the curable resin compositions disclosed in Table 8 was used to manufacture a resin film by coating the resin composition onto a release paper. Next, two of such resin films were laminated onto both sides of a continuous layer of unidirectional carbon fibers (IMS65E from Toho Tenax, USA), with the aid of heat and pressure, to form a UD prepreg. Each resulting prepreg had an average FAW (fiber areal weight) of 197 gsm and 35% w/w resin content based on the total prepreg weight. Test composite laminates were prepared from the prepregs in accordance with the EN2565 method discussed above.

Mechanical Results

The test composite laminates having Particles E and MWCNTs were subjected to mechanical testing and the results are shown in Table 9. The mechanical results reported in Table 9 show that the introduction of insoluble elastomeric particles in combination with MWCNTs in the matrix resin can yield significant improvements in CAI (at 30 J) and $G_{Ic}$ values as compared to otherwise identical materials modified only with MWCNTs (Control 4 as disclosed in Example 2, Table 5) or a material without MWCNTs or polymeric toughening particles (Control 2 as disclosed in Comparative Example 1, Table 2).

TABLE 9

Mechanical results

| Laminates code | Matrix resin code | CAI [30 J] [MPa] | $G_{Ic}$ [J/m$^2$] |
|---|---|---|---|
| Control 2 | Control 5 | 226.0 | 289.0 |
| Control 4 | Control 3 | 240.2 | 291.9 |
| 6a | 5a | 292.1 | 510.6 |

It is believed that the simultaneous improvement in the two mechanical properties—CAI [30 J] and $G_{Ic}$—is the result of a synergistic effect between MWCNTs and the polymeric toughening particles.

Electrical Conductivity Results

Table 10 reports the average z direction conductivity values of the test composite laminates prepared from the prepregs comprising particles E according to the resin compositions Control 5 and 5a.

TABLE 10

Z-direction DC electrical conductivity results

| Laminates code | Matrix Resin Code | Volume conductivity [S/m] |
|---|---|---|
| Control 2 | Control 1 | 0.77 |
| Control 6 | Control 5 | 0.56 |
| Control 4 | Control 3 | 6.00 |
| 6a | 5a | 8.25 |

Z-direction DC electrical conductivity of test composite laminates containing insoluble elastomeric particles (Particles E) but not MWCNTs is equal to 0.56 S/m (Control 6). Z-direction DC electrical conductivity of test composite laminates containing MWCNTs only and without interlaminar polymeric particles is equal to 6.00 S/m (Control 4). Surprisingly, the addition of insoluble particles (Particles E) yielded better electrical performance (8.25 S/m) than that of the laminate modified with only MWCNTs (6.00 S/m). This result is surprising since the addition of insulating elements into the interlaminar region was traditionally expected to substantially decrease the volume conductivity of the cured composite as in the case of the corresponding laminates without MWCNTs (Table 10, Control 2 and Control 6). It is remarkable that such improvement was achieved by reducing the overall MWCNT content in the resin system from 1.55% w/w (Control 4) to 1.35% w/w (Laminates 6a).

What is claimed is:

1. A curable composite material comprising:
at least two layers of reinforcing fibres impregnated with a curable matrix resin; and at least one interlaminar region formed between adjacent layers of reinforcing fibers, the interlaminar region comprising (i) carbon-based, nano-sized structures dispersed in a curable matrix resin, and (ii) insoluble polymeric toughening particles embedded in the same curable matrix resin, wherein
the carbon-based, nano-sized structures have at least one dimension smaller than 100 nm (0.1 μm) and are the only conductive component in the interlaminar region,
the polymeric toughening particles have a mean particle size (d50) which is at least 100 times bigger than the smallest dimension of the carbon-based, nano-sized structures, and the mean particle size is within the range of 10-100 μm,
the polymeric toughening particles are insoluble in the matrix resin at the interlaminar region during curing of the composite material, and remain as discreet particles after curing, and
upon curing, the composite material exhibits electrical conductivity in the z-direction of greater than 1 S/m, Compression Strength After Impact (CAI), after impact at 30 J, of greater than 250 MPa as measured in accordance with ASTM7136/37, and interlaminar fracture toughness under mode I ($G_{Ic}$) of greater than 300 J/m$^2$ as measured in accordance to EN6033.

2. The curable composite material of claim 1, wherein the toughening polymeric particles are dispersed in the interlaminar region at a content of 2% to 20% by weight based on the weight of the total matrix resin content in the composite material.

3. The curable composite material of claim 1, wherein the carbon-based, nano-sized structures are present in an amount within the range 0.1% to 10% by weight based on the weight of the total matrix resin content in the composite material.

4. The curable composite material according to claim 1, wherein the polymeric toughening particles are insoluble thermoplastic particles comprising at least one thermoplastic selected from the group consisting of: polyimide, polyamideimide, polyamide, polyphthalamide, polyetherketone, polyetheretherketone, polyetherketoneketone, polyaryletherketones, polyphenylenesulfide, liquid crystal polymers, copolymers thereof, and derivatives thereof.

5. The curable composite material according to claim 1, wherein the insoluble polymeric toughening particles are insoluble elastomeric particles comprising at least one polymer or polymeric material selected from the group consisting of: cross-linked polybutadiene, polyacrylic, polyacrylonitrile, polystyrene, copolymers thereof, and derivatives thereof.

6. The curable composite material according to claim 1, wherein the insoluble polymeric toughening particles are crosslinked particles, each particle comprising one of:
(a) a crosslinking network created by crosslinking a cross-linkable thermoplastic polymer having one or more one or more reactive groups with a cross-linking agent that is chemically reactive to the reactive groups, and
(b) an inter-penetrating polymer network (IPN) comprising thermoplastic polymer chains intertwined with an independent crosslinking network, wherein said IPN is created by reacting at least one compound having one or more reactive groups, a crosslinking agent that is chemically reactive to the reactive groups, and a thermoplastic polymer.

7. The curable composite material of claim 6, wherein the crosslinked particles are crosslinked polyethersulfone-polyetherethersulfone (PES-PEES) particles.

8. The curable composite material according to claim 1, wherein the carbon-based, nano-sized structures are selected from the group consisting of: carbon nano-tubes (CNTs), carbon nano-fibres, carbon nano-ropes, carbon nano-ribbons, carbon nano-fibrils, carbon nano-needles, carbon nano-sheets, carbon nano-rods, carbon nano-cones, and carbon nano-ohms, carbon black, graphite nano-platelets or nano-dots, graphenes, and combination thereof.

9. The curable composite material according to claim 1, wherein the carbon-based, nano-sized structures are carbon nanotubes (CNTs).

10. The curable composite material of claim 9, wherein the carbon nano-tubes (CNTs) have an aspect ratio from 50:1 to 5000:1.

11. The curable composite material according to claim 1, wherein the carbon-based, nano-sized structures are multi-wall carbon nanotubes (MWCNTs).

12. The curable composite material according to claim 1, wherein the insoluble polymeric toughening particles have an aspect ratio within the range of 5:1 to 1:1.

13. The curable composite material according to claim 1, wherein the interlaminar region is free of any soluble thermoplastic particles that dissolve in the matrix resin upon curing.

14. The curable composite material according to claim 1, wherein the toughening particles are substantially spherical and form a single layer of particles in the interlaminar region such that the interlaminar region has a depth that is defined by the diameters of the toughening particles.

15. The curable composite material according to claim 1, wherein the curable matrix resin impregnating the reinforcing fibers and the curable matrix resin in the interlaminar region comprises one or more thermosetting resins which are common to both matrices.

16. The curable composite material according to claim 1, wherein the curable matrix resin impregnating the reinforcing fibers is substantially the same as the curable matrix resin in the interlaminar region without the nano-sized structures and toughening particles.

17. The curable composite material according to claim 1, wherein the curable matrix resin impregnating the reinforcing fibers and the curable matrix resin in the interlaminar region comprises uniformly dispersed carbon-based, nano-sized structures.

18. The curable composite material according to claim 1, wherein the reinforcement fibers are carbon fibers.

19. The curable composite material according to claim 1,
   wherein the polymeric toughening particles are substantially spherical in shape and the carbon-based, nano-sized structures are carbon nanotubes,
   wherein the polymeric toughening particles have a mean particle size (d50) of at least 100 times greater than the diameter of the carbon nanotubes.

20. The curable composite material according to claim 1, wherein the matrix resin is a thermosettable resin comprising epoxy or bismaleimide as a major component.

* * * * *